(12) United States Patent
Hartman et al.

(10) Patent No.: US 8,301,474 B2
(45) Date of Patent: Oct. 30, 2012

(54) CONTACT CENTER INTEGRATION INTO VIRTUAL ENVIRONMENTS

(75) Inventors: Michael Hartman, Galway (IE); Tony McCormack, Galway (IE); Neil O'Connor, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 289 days.

(21) Appl. No.: 12/739,226

(22) PCT Filed: Oct. 20, 2008

(86) PCT No.: PCT/EP2008/008858
§ 371 (c)(1),
(2), (4) Date: Apr. 22, 2010

(87) PCT Pub. No.: WO2009/053014
PCT Pub. Date: Apr. 30, 2009

(65) Prior Publication Data
US 2010/0306021 A1    Dec. 2, 2010

(30) Foreign Application Priority Data
Oct. 22, 2007   (GB) .................................. 0720598.2

(51) Int. Cl.
*G06Q 40/00*   (2012.01)
(52) U.S. Cl. ..................................... 705/7.11; 705/7.42
(58) Field of Classification Search ............. 705/7, 7.11, 705/7.42
See application file for complete search history.

(56) References Cited

U.S. PATENT DOCUMENTS

| | | | |
|---|---|---|---|
| 5,450,482 A * | 9/1995 | Chen et al. .................... | 379/230 |
| 6,754,335 B1 * | 6/2004 | Shaffer et al. ............ | 379/266.02 |
| 6,868,391 B1 * | 3/2005 | Hultgren ......................... | 705/17 |
| 6,937,715 B2 * | 8/2005 | Delaney ................... | 379/265.09 |
| 7,023,979 B1 * | 4/2006 | Wu et al. .................. | 379/265.11 |
| 7,110,523 B2 * | 9/2006 | Gagle et al. ............. | 379/265.01 |
| 2002/0035647 A1 * | 3/2002 | Brown et al. ................. | 709/312 |
| 2004/0062380 A1 * | 4/2004 | Delaney .................. | 379/265.02 |
| 2007/0140467 A1 | 6/2007 | McCormack et al. | |
| 2007/0203828 A1 | 8/2007 | Jung et al. | |

FOREIGN PATENT DOCUMENTS

| | | |
|---|---|---|
| WO | 2005015880 A | 2/2005 |
| WO | WO 2005015880 A1 * | 2/2005 |
| WO | 2008068151 A | 6/2008 |
| WO | WO 2008068151 A2 * | 6/2008 |

OTHER PUBLICATIONS

Form PCT/ISA/210, "International Search Report" for PCT/EP/2008/008858 mailed Jun. 29, 2009 (4 pages).
Form PCT/ISA/237, "Written Opinion of the International Searching Authority," for PCT/EP/2008/008858, mailed Jun. 29, 2009 (6 pages).

* cited by examiner

*Primary Examiner* — Thomas Dixon
*Assistant Examiner* — Benjamin S Fields
(74) *Attorney, Agent, or Firm* — Maldjian Law Group LLC; John P. Maldjian, Esq.; Alexander D. Walter, Esq.

(57) ABSTRACT

A contact center has an interface with a virtual environment implemented in a computer system. The operation of the contact center includes receiving, from the virtual environment, spatial information relating to the spatial position within the virtual environment of an inhabitant of the virtual environment, and queuing a contact relating to that inhabitant in a queuing system of the contact center. Queuing decisions are based, at least in part, on the spatial information of the inhabitant in the virtual environment.

36 Claims, 6 Drawing Sheets

Fig. 7

CONTACT CENTER INTEGRATION INTO VIRTUAL ENVIRONMENTS

TECHNICAL FIELD

This invention relates to the integration of contact center technology with other technologies. The invention has particular application in integrating contact centers with virtual environments such as games and alternate worlds.

BACKGROUND ART

Commonly assigned U.S. patent application Ser. No. 11/608,475 discloses the provision of a link between an online multiplayer game and a contact center. A mechanism is provided in the game which can be activated by a player of the game, and upon activation, a communications channel is opened from the game to an agent of the contact center. The player can thus remain in the game and can communicate from the game environment to the contact center.

The present invention provides improvements in communications between contact centers and online virtual environments, including but not limited to online games.

DISCLOSURE OF THE INVENTION

Accordingly, there is provided a method of operating a contact center having an interface with a virtual environment implemented in a computerized system, comprising the steps of:
  a) receiving from the virtual environment spatial information relating to the spatial position within the virtual environment of an inhabitant of the virtual environment;
  b) creating and maintaining contact information in the contact center, the contact information being associated with the inhabitant and including the spatial information;
  c) providing the contact information to a queuing system of the contact center; and
  d) the queuing system making a queuing decision based on the spatial information.

The method allows queuing decisions to be made based on considerations which are not normally available to a contact center, namely the location of an inhabitant of a virtual environment. Such information can allow for more sophisticated routing of a contact in a queuing system, and more accurate handling of the interaction between the customer, represented by the inhabitant of the virtual environment and the agent of the contact center.

The contact may be created automatically in step (b) as a result of receiving in step (a) the location information.

Thus, for example, the movement of an inhabitant of the virtual environment can cause a contact to be created in a contact center relating to that inhabitant. For example, a character walking through the door of a shop can automatically trigger the creation of a contact in a queue, so that when the contact reaches the top of the queue and an agent becomes free, the agent can initiate contact within the virtual environment.

Suitably, the contact is created when a match is noted between the spatial position of the inhabitant and a predetermined condition.

Thus, inhabitants' movements can be monitored against defined criteria, with inhabitants whose position matches such criteria giving rise to the creation of contacts based on location information received at the contact center from the virtual environment.

Alternatively, the contact can be created in step (b) as a result of a user of the virtual environment having control of the inhabitant initiating contact with the contact center.

An example of this might be the user controlling a character to enter a telephone booth and place a call to a contact center, or the user beginning an interaction with a virtual shop assistant.

Typically, the queuing decision of step (d) is based not only on the spatial information but also on other information available to the queuing system.

For example, the profile of the user, the purchase history of the inhabitant of the contact center, and so forth may also influence the queuing decision.

Examples of the spatial information can include:
  (i) an absolute position within the virtual environment;
  (ii) an indication of a zone or area of the virtual environment;
  (iii) an identification of another character, artefact, object or entity of the virtual environment in the vicinity of the inhabitant;
  (iv) an identification of another character, artefact, object or entity of the virtual environment in the field of view of the inhabitant;
  (v) an identification of another character, artefact, object or entity of the virtual environment in the vicinity of a projected path of travel of the inhabitant; and
  (vi) an identification of a member of a class of entities present in the virtual environment, the member of the class being selected on the basis of proximity to or accessibility from the location of the individual.

Preferably, the method can further include the steps of allocating the contact to an agent of the contact center, and providing the location information to a system employed by the agent of the contact center prior to or during an interaction with the inhabitant.

In one example, the agent can be informed, using the contact center agent software, of the location of the inhabitant.

More preferably, however, the system employed by the agent to which the location information is provided comprises a program providing access to the virtual environment.

In this way, the agent can interact with the inhabitant within the virtual environment, and the program used by the agent for such access can be supplied with the location information of the inhabitant. This can be used to place the agent in the vicinity of the inhabitant, or to give the agent the ability to readily navigate to the same location for a face to face interaction.

In this aspect the invention also provides a computer program product including a data carrier having encoded thereon machine readable instructions which when executed in a computer system of a contact center having an interface with a virtual environment, are effective to cause the computer system to carry out the aforethe method.

There is further provided a computer system of a contact center operating a program which causes the system to operate the method as described above.

There is also provided a method of operating a contact center having an interface with a virtual environment implemented in a computerized system, comprising the steps of:
  a) receiving from the virtual environment spatial information relating to the spatial position within the virtual environment of an inhabitant of the virtual environment;
  b) creating and maintaining contact information in the contact center, the contact information being associated with the inhabitant;

c) providing the contact information to a queuing system of the contact center, such that the inhabitant is queued to interact with a live agent of the contact center;
d) estimating an expected wait time for a live agent to become available to interact with the inhabitant;
e) using the spatial information to estimate a time delay for the inhabitant to require live agent intervention following an automated interaction;
f) comparing the estimated time delay with the expected wait time; and
g) providing to the inhabitant an automated interaction designed to reduce the difference between the estimated time delay and the expected wait time.

This method provides for an automated interaction to be followed by a live agent interaction, with the wait time being taken into account when carrying out the automated interaction, so as to optimize the experience for the user controlling the inhabitant involved with the automated interaction. In this way, the system can accelerate or slow down the pace of the interaction, and/or extend or shorten the content of the interaction, so that the user is occupied and interested as much as possible until an agent becomes free to take over the interaction.

The estimated time delay for the inhabitant to require live agent intervention employs spatial information, either exclusively, or in conjunction with other information available to the computerized system. It is envisaged also that the system can estimate the time delay without employing any spatial information, relying on (say) user history and profile.

Preferably, however, the spatial information employed in estimating the time delay is selected from:
  (i) an absolute position within the virtual environment;
  (ii) an indication of a zone or area of the virtual environment;
  (iii) an identification of another character, artefact, object or entity of the virtual environment in the vicinity of the inhabitant;
  (iv) an identification of another character, artefact, object or entity of the virtual environment in the field of view of the inhabitant;
  (v) an identification of another character, artefact, object or entity of the virtual environment in the vicinity of a projected path of travel of the inhabitant; and
  (vi) an identification of a member of a class of entities present in the virtual environment, the member of the class being selected on the basis of proximity to or accessibility from the location of the individual.

Preferably, the step of providing to the inhabitant an automated interaction designed to reduce the difference between the estimated time delay and the expected wait time, comprises selecting from among a plurality of script options; accelerating or retarding a rate of interaction; or delaying the initiation of an interaction.

In this aspect the invention also provides a computer program product including a data carrier having encoded thereon machine readable instructions which when executed in a computer system of a contact center having an interface with a virtual environment, are effective to cause the computer system to carry out the aforethe method.

There is further provided a computer system of a contact center operating a program which causes the system to operate the method as described above.

In another aspect there is provided a method of operating a computerized system operating a virtual environment and having an interface with a contact center, comprising the steps of:

a) receiving from the contact center information regarding a queuing system maintained by the contact center;
b) providing within the virtual environment a virtual queue representation of the queuing system, based on the received information;
c) providing an inhabitant of the virtual environment with access to the virtual queue representation when a contact is queued for the inhabitant in the queuing system of the contact center;
d) providing within the virtual queue representation one or more entities with which the inhabitant may interact with a variable result;
e) upon the inhabitant interacting with one of the entities, determining a result of the interaction; and
f) notifying the result of the interaction to the queuing system of the contact center whereby the queuing position of the inhabitant in the queuing system of the contact center may be modified based on the result.

In conventional contact centers, users have little control over their position in a queue, other than an option to select a callback or leave a message rather than continuing to queue. Similarly, users have minimal information about their queue position, other than perhaps the playing of periodic recorded messages setting out expected wait times.

This method addresses these twin issues by firstly, providing a representation within the virtual environment of the contact center's queuing system such that the user can be given a sense of his or her position and progress within the queue. Moreover, the user is provided with an opportunity to undertake an interaction with one or more entities with a variable outcome, with the result that the user's queue position can be modified based on the outcome. This means, in effect that a user can influence a queue position on an interactive basis.

In a preferred embodiment, the virtual queue representation comprises a journey which may be undertaken by the inhabitant within the environment.

By representing the queue as a journey or path to be traversed, it is possible to introduce a goal or endpoint, or to introduce other indications of progress (e.g. milestones). Such a representation empowers the user by showing real progress, in contrast to the uninformative on-hold status typically experienced by those queuing in a contact center queue. The distance to a goal or endpoint (if visible) or the rate of progress can be tailored dynamically to take account of progress within the queue or changing conditions at the contact center.

Preferably, the one or more entities with which the inhabitant may interact with a variable result are selected from one or more of:
  (i) an inhabitant of the virtual environment operated by a user of the environment;
  (ii) an automated inhabitant of the virtual environment;
  (iii) an obstacle to be negotiated;
  (iv) a maze to be traversed;
  (v) a journey to be completed;
  (vi) a puzzle to be solved;
  (vii) a challenge to be undertaken; and
  (viii) a game to be played.

Preferably, the one or more entities with which the inhabitant may interact are presented sequentially to the inhabitant.

In this way, a user can be occupied by a series of challenges, obstacles, battles or puzzles (for example) facing his or her character within the virtual environment, each such interaction providing a further chance to reduce queuing time (or avoid an increased queuing time perhaps).

Preferably, the sequential presentation occurs as the inhabitant moves along a path within the environment.

Thus, a path can be traversed in storyline fashion as a series of encounters. The number and nature of encounters can be tailored to the expected wait time, or the system can simply continue to present fresh encounters until the user is at or near the top of the queue.

In a particularly preferred embodiment, the one or more entities with which the inhabitant may interact with a variable result comprise at least one other inhabitant also present in the virtual queue representation, the at least one other inhabitant also having a queuing position within the queuing system of the contact center, wherein the result of the interaction is determinative of a modification of the queuing positions of one or both inhabitants involved in the interaction.

This option introduces the concept of competitive queuing, with users competing with one another within the virtual environment for an advantage which is expressed as a modification of queuing position for one or both competitors. The modification could be a straight swap of queue positions, or each player might be awarded a different increase (or decrease) in queuing position based on the result of the interaction. One can envisage a queue in which multiple inhabitants try to eliminate each other, with queuing positions of one or many parties being affected by each interaction.

The method can also include the steps, carried out at the contact center, of
 a) providing the information regarding the queuing system to the computerized system;
 b) receiving notification of the result of the interaction; and
 c) modifying the queuing position of the inhabitant in the queuing system of the contact center based on the result.

Optionally, the queuing position of the inhabitant is modified to ensure a minimum rate of progress within the queue, irrespective of the result of the interaction.

In this way, users can be assured of reaching their goal sooner or later, even if they choose not to participate in the interactions or if they perform poorly in one or more interactions.

Once again this aspect of the invention also provides an associated computer program product and a computerized system.

There is also provided a method of operating a system comprising a virtual environment implemented in a computerized system and a contact center having an interface with the virtual environment, comprising the steps of:
 a) providing within the virtual environment an interface with an external website having an offer for sale or supply of services;
 b) providing to an inhabitant of the virtual environment a mechanism to request live agent assistance with a purchasing decision;
 c) upon the inhabitant requesting live agent assistance, providing the request from the virtual environment to the contact center; and
 d) upon the contact center allocating the request to an agent of the contact center, placing the agent and the inhabitant in communication with one another.

There is also provided a method of operating a contact center having an interface with a virtual environment implemented in a computerized system, comprising the steps of:
 a) receiving from the virtual environment a request issued by or on behalf of a first inhabitant of the virtual environment;
 b) identifying the request as being a request to act as an agent of the contact center;
 c) authorizing the first inhabitant to act as an agent of the contact center;
 d) adding, to a stored record of agents available to the contact center, information relating to the first inhabitant; and
 e) receiving from the virtual environment contact requests from further inhabitants of the virtual environment for contact with an agent; and
 f) allocating the contact requests among the agents identified in the stored record.

Suitably, the request in step (a) is received as a result of the first inhabitant accessing a location in the virtual environment which is assigned as a registration location for inhabitants wishing to act as agents.

Preferably, step (c) comprises determining that the first inhabitant is recorded as being authorized to act as an agent and/or determining that the first inhabitant passes a test presented to the first inhabitant.

Preferably, step (d) comprises recording a skillset for the first inhabitant in the stored record, whereby the skillset information is used in allocating contact requests in step (f).

This aspect of the invention also provides a corresponding computer program product and computerized system implementing the method as described above.

DETAILED DESCRIPTION OF PREFERRED EMBODIMENTS

Figure 1:
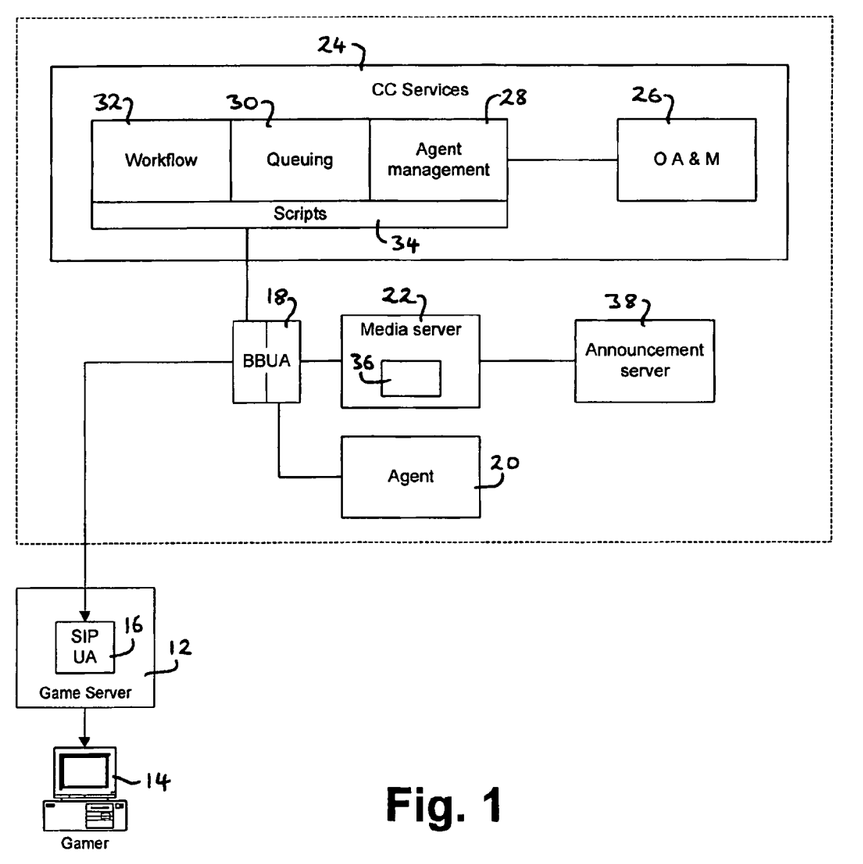
FIG. 1 is an architecture of a system comprising a contact center in communication with a game server.

FIG. 1 is a simplified architecture of a system providing integration between a contact center, indicated generally at 10, and a virtual environment, represented by a game server 12. In FIG. 1, the connections shown are logical connections and details of networks connecting the various entities are omitted for increased clarity. It will be understood that the various connections can be implemented over various wired and wireless networks, including local area networks and wide area networks, such as the Internet.

A gamer's computer system 14 is connected to the game server, i.e. the user of system 14 is logged into a game and is controlling a character (or "avatar" or "individual") within the game environment. Typically, the game environment will simultaneously host many hundreds or thousands of such characters. The terms character, avatar and individual are used interchangeably herein.

The game server 12 includes numerous pieces of software responsible for implementing a complex game environment and its associated systems. In particular, software running on the game server implements a session initiation protocol user agent (SIP UA) 16. As the skilled person will know, a SIP UA is a software entity which can take part in communications sessions (acting as a "user agent client" or a "user agent serve", depending on whether it is initiating or responding to a request) using the session initiation protocol defined in the IETF standard RFC 3261.

The SIP UA 16 has an interface within and is integrated with the game environment in such a way that the gamer's character can activate the SIP UA to send an INVITE message to the contact center 10. For example, the player's character might enter a virtual "telephone booth" in order to initiate such communications. Alternatively, the game client or program interface used by the gamer at system 14, might have commands or icons available to the gamer to initiate such contacts. Numerous other possibilities exist, including, for example, the player's character entering a store and approaching a store assistant in order to trigger a SIP INVITE message to the contact center, or a character standing in front of an advertising display and triggering a SIP INVITE.

The SIP INVITE message is directed to the contact center and is handled within the contact center by a back-to-back user agent (commonly referred to using the acronyms BBUA or B2BUA) 18. The BBUA is also defined in the IETF standard RFC 3261, and is effectively a concatenation of a SIP user agent server and a SIP user agent client. More particularly, the BBUA is a logical entity that receives a request and processes it as a user agent server (UAS). In order to determine how the request should be answered, it acts as a user agent client (UAC) and generates requests. Unlike a proxy server, it maintains dialog state and must participate in all requests sent on the dialogs it has established.

The BBUA's user agent server component thus handles messages such as the SIP INVITE from the game server's SIP UA 16, to which it can respond by agreeing to participate in a SIP session with the game's SIP UA 16. The user agent client component of the BBUA communicates with other components of the contact center to decide what responses the server component should send. In this way, the BBUA may receive a SIP INVITE message, acknowledge it and accept the SIP INVITE, and then initiate its own SIP sessions with internal contact center components and resources such as an agent terminal 20, a media server 22, and a central management unit known as contact center (CC) services 24.

CC services 24 has a number of components, including an operations, administration & management component (OA & M) 26, an agent management component 28, a queue management component 30, and a workflow component 32.

The agent management component 28, queue component 30 and workflow component 32 operate according to one or several scripts 34, which implement the programming rules laid down by the contact center administrators to efficiently handle all types of contacts, both incoming and outgoing, made with the contact center 10.

Typically, and as is well known in the art, an incoming telephone call in the form of a SIP session will be notified by the BBUA 18 to CC services 24. The general progress of this contact is specified in the workflow component 32, which will typically route an incoming voice contact, for example, to an interactive voice response (IVR) session. In order to achieve this, BBUA 18 is instructed to open a connection with media server 22.

The media server creates a communications space or conference 36, and the BBUA negotiates with the remote SIP user agent 16 to put communicate with conference 36 via a real time protocol (RTP) stream which carries voice and other data between gamer terminal 14 and conference 36.

Messages or voice prompts are stored on an announcement server 38, and this announcement server 38 is controlled by workflow 32 to deliver individual recorded voice prompts into the conference 36 from where they are communicated to the gamer 14. The gamer may respond with voice responses or with inputs from another source. These responses are notified to the workflow 32 which acts accordingly, i.e. by playing another announcement, by adding data to a contact file relating to this caller, by making a queuing decision, or by instructing the BBUA to transfer the call directly to a particular agent, for example.

Most typically, the call will be entered into a queue on the basis of information gleaned from the session thus far, in combination with information known about the contact from databases available to the contact center. For example, the customer may have entered an account number during the IVR session, in which case information associated with that account may be used to assist in queuing the contact.

Typically, a contact will be assigned a priority and one or more skillsets, and these are used to position the contact within one or more of a number of queues managed by the queue component 30. A plurality of agents such as agent 20 are available to service the queues, and the allocation of agents to particular queues is controlled by the agent management component 28, which matches the resources available to the contact center in terms of agents and their known skills with the resources required by each queue.

When a contact reaches the top of the queue, a decision is taken to allocate that particular call to a particular agent, and the BBUA 18 puts the two parties into contact by conferencing the agent 20 into the same conference 36 as the gamer 14.

The process as described thus far is entirely conventional, other than the integration of the SIP UA 16 with a game server 12. However, the involvement of the game server 12 opens up new possibilities which will now be described.

The game server 12 is one implementation of a virtual environment. A virtual environment need not take the form of a game. Two currently popular virtual environments are massively multiplayer online games such as "World of Warcraft", "EverQuest" and "Final Fantasy", and alternative worlds such as "Second Life", which are not strictly speaking games at all. Such virtual environments, whether they take the form of games or not, represent attractive markets to providers of goods and services (both virtual and real), given that they constitute collections of individuals with identifiable interests. Contact centers provide a useful mechanism for engaging with the players or users of these virtual worlds. Furthermore, the virtual environments may themselves include elements of an economy, such as money or a representation of money, bank accounts, and so on.

By virtue of the fact that an individual within the virtual environment (i.e. the gamer's/user's character or avatar) has a spatial position, it is possible to provide information about this spatial position to the contact center, and for the contact center to employ such spatial information in queuing and routing the contact.

Accordingly, the game server 12 may interact with the SIP user agent 16 to send information regarding the position of the individual in the virtual environment, either as part of the SIP INVITE message or as a SIP INFO message communication to the BBUA of the contact center. This spatial information can provide powerful clues to the contact center as to how the contact ought to be handled.

In a first example, the contact center has assigned a priority weighting to different spatial areas within the virtual environment. On this basis, a contact coming from a player whose position is indicated to be in an area or zone assigned a high priority, will have a higher queuing priority a contact coming from an individual located outside such an area or from an individual located in another area whose priority weighting is lower. The entire virtual environment can be subdivided into different zones, each having its own priority weighting, or priority weighting may be attached only to particular zones, such as individual shops.

In a second and related example, rather than priority weightings, skillset associations may be allocated to various zones. In this way, an individual who is situated in, for example, a predominantly Spanish-speaking part of the virtual world, may have its contact automatically allocated a Spanish language skillset, so that the contact is routed to a contact center agent whose own skillsets include the ability to speak Spanish.

Alternatively, as a character wanders from virtual shop to virtual shop within a commercial shopping district of a virtual environment, the skillsets connected to a contact from that player might change accordingly, so that when the character is located in a software shop, it might be identified within the contact center by a contact having skillsets related to the type of software being browsed, while a contact arriving at the contact center from the same individual while that individual is in a section of a virtual library dealing with graphics card issues, for example, might have a skillset associated with graphics cards attached to it.

Figure 2:
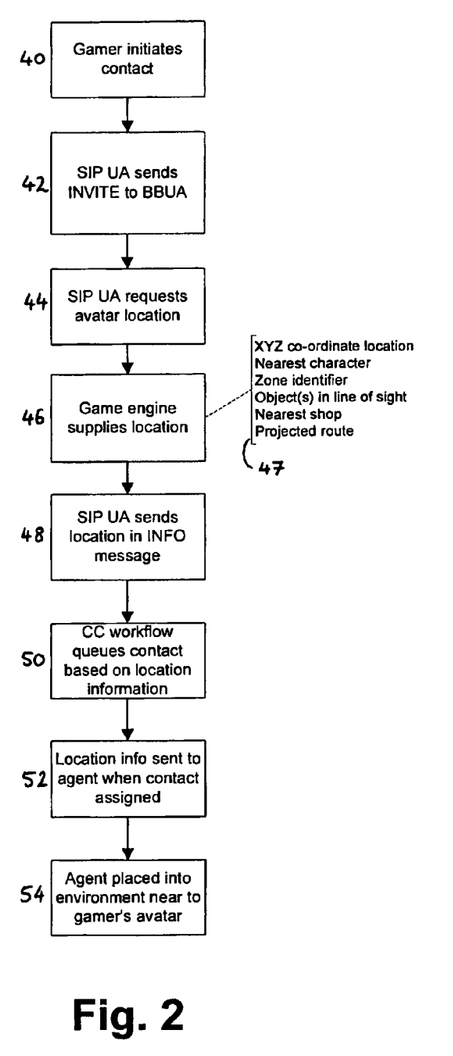
FIG. 2 is a flowchart of a method of queuing a contact from an inhabitant of a virtual environment.

Referring to FIG. 2, a flowchart of an exemplary process is given. In this example, the gamer (or more generally, the person controlling the inhabitant of the virtual world) initiates contact with a contact center by some action, gesture or command, step 40. This can be consciously initiated, or can be initiated without the gamer knowing that the effect of his or her actions is to initiate contact. Thus, for example, wandering into a shop might suffice to initiate a contact in the background, unknown to the gamer.

In step 42, the SIP UA 16 (FIG. 1) integrated with the gamer server 12, sends an INVITE message to the BBUA 18 of contact center 10. The BBUA will acknowledge this request and will set in motion the actions dictated by script 34 and workflow 32 of the contact center services 24.

In step 44, the SIP UA requests the location of the gamer's avatar in the virtual environment. The game engine 12 supplies this location in step 46. As indicated at 47, the location information (also referred to as spatial information) can be provided in numerous different ways. The most straightforward is to supply an absolute location in terms of x-y-z coordinates or some other coordinate system.

The location could, however, be expressed in very different terms, such as by identifying the nearest character to that avatar (so that location is defined in terms of proximity to another character), or perhaps by specifying all characters within a particular range of the avatar. Another alternative is to express location in terms of a predefined zone within the virtual environment. Different locations can share the same zone identifier, even if widely separated. Thus, for example, all music shops might have one zone identifier, and all software help desks might have another zone identifier.

To give a different example, areas of the environment which are predominantly inhabited by inhabitants controlled by teenagers might be identified with the first zone identifier, whereas locations more likely to be inhabited by inhabitants controlled by adults might have a different zone identifier. One could imagine, therefore, that skateboard parks, coffee shops, meditation retreats, and music festivals might each be identified with different zone identifiers which would be useful in allowing a contact center to make assumptions about routing and queuing contacts from each such area. Even within the confines of a music festival, different stage areas might have different zone identifiers, depending on the type of music allocated to each area. This zone identification is likely to be dynamic and to change over time.

Another example of how location information might be provided by the game engine in step 46 is to specify the location of an individual within the virtual environment in terms of one or more objects which are in the line of sight of that individual, or in terms of objects with which the individual can interact, or of objects within earshot, or of objects towards which the individual is facing, etc. Thus, when in a shop environment, for example, the likely current interests of an individual might be inferred from the direction in which that individual is facing, if surrounded by various display stands.

Another example of location information is to specify the nearest example of some particular entity, such as the nearest shop, or to specify the identity of each such entity within a predetermined range or travelling time. Such information could be useful to an agent of the contact center to assist the agent in directing the gamer's avatar to the nearest shop.

Another example of location information is to specify the projected route of a moving individual, or to specify objects which are likely to be encountered by that individual if it moves in an expected direction.

If will be appreciated that the ways in which location information can be specified are many and diverse, and will be driven largely by the interests of the contact center, the abilities of the virtual environment and the underlying engines and software implementing that environment, and the imagination of the designers. Any information available from the game environment relating to the location of the individual is potentially usable.

In step 48, the SIP UA packages this location information received from the game server in a message, such as, for example, a SIP INFO message, or as an optional header in the initial INVITE message. This is sent to the BBUA and the BBUA 18 passes this on to the workflow 32. The contact center workflow 32 proceeds to queue the contact and to provide it with treatments such as interactive voice response treatment, media delivery, and agent allocation, etc., based at least in part on the location information, step 50.

In step 52, the location information is optionally sent to the agent when the contact has been assigned. Typically, the agent will be operating a client program similar to that used by the gamer 14, such that the agent has a character within the virtual environment, or has a view into the virtual environment, perhaps while remaining invisible. The agent's client program can be integrated with the more conventional aspects of a contact center agent desktop, or it can be running alongside an agent desktop program. The location information may be provided explicitly to the agent (e.g. "The person you are speaking with is at grid location 315-102-008", or "The person you are speaking with is standing in the fast food outlet on the corner of $8^{th}$ Street and $4^{th}$ Avenue"). The location could be provided as an indication on a map accessible to the agent, or the location could be provided by highlighting the avatar of the gamer to whom the agent is speaking with, for example, a halo or other indicator.

Preferably, however, the location information which is sent to the agent workstation in step 52 is used directly by the game client employed by the agent to place the agent into the environment near to or adjacent the gamer's avatar, step 54. In this way, if the agent is already in the virtual environment but a long way from the newly assigned contact, a teleport function can transport the agent's avatar to the vicinity of the gamer's avatar or to, for example, the closest teleport station, bus stop, spawn point, or other predetermined location.

When the contact is assigned to the agent, the normal processes of the contact center will occur simultaneously, such as to place the agent into voice communication with the conference 36 on media server 22, and to instruct SIP UA 16 running on the game server to conference the gamer into the same conference. As the skilled person will be aware, this session initiation serves only to set up the session, and the voice, video or multimedia contact session between the gamer 14 and agent 20 is conducted by means of data streams directly to and from the conference area 36.

In FIG. 2, the location information is explicitly sent by the game server to the contact center BBUA. This assumes co-operation between the operator of the virtual world and the operator of the contact center. Even without such co-operation, the contact center operator may make use of location information received from the virtual world by taking advantage of the location information which is inherently provided to each inhabitant of the virtual world. For example, if a contact center agent operates a game client (just like any other player of the game), then the agent's game client will receive information regarding the location of the agent's avatar relative to the world as a whole (since it must be able to render the avatar within the world, this information must be provided in some form or other) and to other inhabitants of the virtual world in the vicinity of the agent's avatar (otherwise such inhabitants could not be represented by the agent's game client). The information available to the game client may also include a trace function where any player can trace the avatar of other players, and if so, then this information can also be used. Therefore, the provision of spatial information by the virtual environment servers need not be additional to that normally provided from the game to each player, but it is preferable if the virtual environment server can tailor the spatial information in the format most useful to the contact center.

FIG. 2 showed the interaction between the gamer and the contact center being put in place, and it was stated that the initiation of the SIP UA could occur in many ways. One particular example of initiating the contact will now be described in greater detail.

Figure 3:
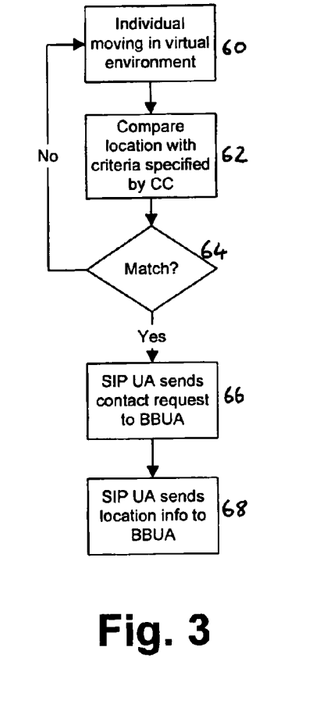
FIG. 3 is a flowchart of a method of automating contact requests from inhabitants of a virtual environment.

FIG. 3 is a flowchart illustrating how the game server or virtual environment server can automatically initiate contacts between inhabitants of the virtual environment and a contact center.

In step 60, an individual is logged into and moving about the virtual environment. Continually or periodically, the server having responsibility for the position of the individual within the virtual environment compares the location of the individual with predetermined criteria specified by the contact center, step 62. These criteria may be any suitable criteria, such as those described above in relation to step 46 of FIG. 2.

A check is made whether there is a match between the location of the individual and the criteria, step 64. If not, the process reverts to step 60 and continues to repeat until there is a match. When a match is found in step 64, the game server causes the integrated SIP UA to send a contact request to the BBUA of the contact center, step 66. At this point, the user or gamer responsible for the inhabitant of the virtual world may not even be notified that a contact request has been sent.

The SIP UA follows up this contact request with the location information provided by the server, and this too is sent to the BBUA, step 68.

One example of this process in operation is where there is a scarce resource within the virtual environment for which inhabitants may be compete. For example, a designer or stylist may announce that the first ten "people" (i.e. virtual environment inhabitants) to arrive to her salon will get a free costume. (It is to be understood that the costume, the salon and the people are all virtual entities within the environment.) The designer making the announcement may be controlled by a real person, may be automated, or may be provided in multiple instances, each controlled by a different person such as a different agent of a contact center.

For each person arriving within a predefined zone in front of the designer's shop, a location match, as shown in steps 62 and 64, would be made. This would cause, for each such person, a contact request to be sent to the BBUA, together with an indication of the location of that person. The BBUA would employ this contact request as an indication to place that inhabitant into a queue for the services on offer. Rules could be put in place stating that the inhabitant would be required to remain in the vicinity of the store to keep a place in queue, or alternatively, having established a position, the inhabitant might be free to wander off until called. The queue would be serviced by the designer in order, according to the sequence of arrival in front of the salon.

Another example of this method in operation is in the event of a contact center providing customer service in a number of different stores. Each person entering a store might cause a location match to be performed against the criteria maintained on behalf of that contact center. As and when contact center agents become free, the agents can then approach the person currently at the top of the queue in each store. Again, this requires no input on behalf of the inhabitant of the virtual world, other than to arrive into the store and begin browsing. In the background, and unknown to them, they are being queued for service, and are approached by agent avatars (representing shop assistants) when they reach the top of their queue.

Figure 4:
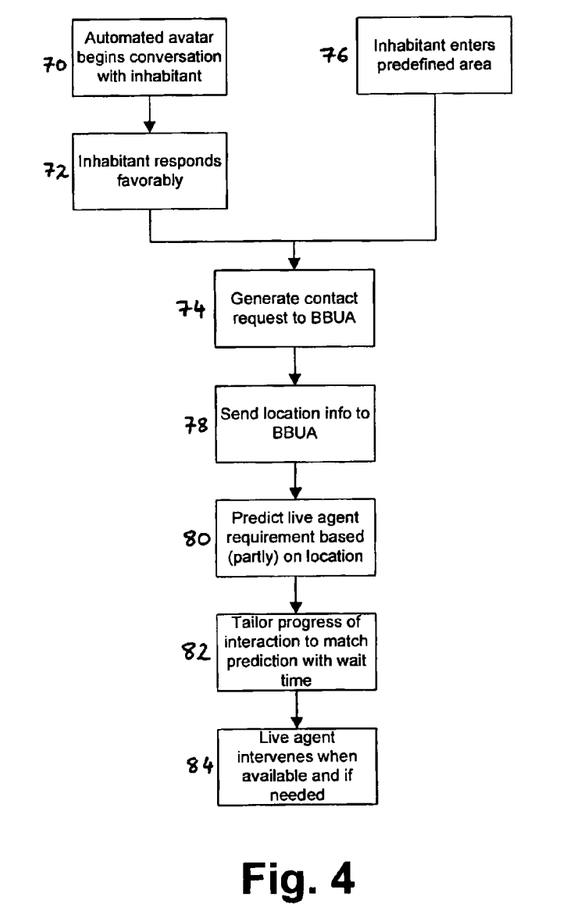
FIG. 4 is a flowchart of a method of tailoring automated interactions to match expected queuing times.

FIG. 4 describes another process which takes advantage of location information to provide a better contact center experience.

In step 70, an automated avatar which operates on behalf of the contact center within the virtual environment, begins a conversation with an inhabitant. This can be an inhabitant who has been identified as a likely target, or can be a randomly encountered inhabitant. The automated avatar is provided with a script which it follows in order to assess the interest of the inhabitant in whatever service is being offered.

If the inhabitant responds positively, in step 72, then the automated avatar causes a contact to be set up and queued within the contact center. This can be done by generating a SIP INVITE request to the contact center's BBUA, as described previously, or the automated avatar may be controlled by a process of the contact center which itself has access to the workflow and queues.

As an alternative way of initiating this process, the inhabitant may cause a contact request to be sent to the contact center automatically simply by entering a predefined area, as indicated in step 76.

The location information relating to the inhabitant is sent to the contact center, such as by sending an INFO message to the BBUA containing location information received from the game server, or in some other way. The location information may be simply the location of the automated avatar who is in conversation with the inhabitant. In this process it is assumed that inhabitant location is an indicator of the likely progress of this contact. So, for example, some locations may be associated with a high likelihood that an agent will be required, and other locations with a low likelihood. Some locations may have associated with them a likelihood that an agent will be needed sooner rather than later. Other locations may have a history of customers interacting with the automated avatar for quite a considerable length of time until a live agent is needed.

Accordingly, in step 80, a prediction is made regarding the requirement for live agent intervention based on this location information. This prediction can be based also on other factors in addition to the location information, such as the prior history of the inhabitant with that contact center, the prior history of the inhabitant in making other purchases within the virtual environment, or demographic information derived from the profile of the account associated with the inhabitant. It is to be noted that the location information is not the only information used to make decisions, and the decision may also take into account other factors, such as the profile of the character or the user of that character, purchasing history, and so on.

Some examples of the types of predictions that might be made based on location information include:

1. An inhabitant follows signs to a ticket desk selling tickets to a series of concerts by a famous artist. In such cases, an assumption might be made that the likelihood of any live agent intervention being required is very low, since the vast majority of customers can simply choose the dates, times, and number of tickets, and complete the financial transaction with an automated avatar or indeed a representation of an automated kiosk similar to an ATM.
2. An inhabitant browses through a music catalog which allows for automated purchases, and then approaches a customer help desk. The presence of the customer at this desk is a likely indication that live agent intervention will be required soon, since it might safely be assumed that the automated catalog would have been able to answer many simple questions and thus that the customer requires clarification on some matter not covered by the catalog, i.e. a matter requiring an agent.
3. A customer, browsing within an online representation of a computer shop, approaches a customer service avatar. In this location, the likely requirement for live agent involvement may be seven minutes, i.e. the average customer may spend that amount of time discussing options presented to it by the avatar, before finally requiring a live agent at the point of making a decision and purchase.
4. An automated avatar wandering through a virtual environment offering tour guide services may be able to answer some basic questions about the service to interested parties, but may require a live agent once a tour actually begins. In such cases, a prediction may be made that when the avatar is speaking with inhabitants in a skateboard park, for example, the likelihood of agent involvement is actually quite low, since the users of such skateboard parks may have been found in the past to be most unlikely to actually engage a tour guide. Conversely, the same tour guide, in a wealthy district, a holiday destination, or an area frequented by new inhabitants of the virtual environment, may associate a much higher likelihood of live agent requirement in a short period of time with such locations.

Having made a prediction as in step 80, the automated agent interacts with the inhabitants based on this predicted time. Accordingly, the automated agent avatar can follow a script which is intended to bring the conversation to the point where the live agent interaction is required at a time which suits the agent availability and the predication for live agent intervention.

If agent involvement is predicted to be required within two minutes of a conversation beginning, but no agent is actually expected to become available within the contact center to service this contact for three minutes, then the automated agent may follow a script which exhibits the persona of a slow-speaking character, step 82, or of a character who wanders off the point and makes conversation not directly related to the expected sale or service, so as to delay the interaction.

Alternatively, where the inhabitant in question has entered a store, the store assistant may, based on the likely delay in live agent availability relative to the predicted time to require such an agent, delay in approaching the customer, or may momentarily disappear. When a live agent becomes available, he may intervene in the conversation if needed, step 84. Having tailored the interaction based on the predicted time for the agent to become free, the automated system provides the agent to the customer at a point in time which seems more appropriate than where a customer is simply made to queue or hold for an agent.

A further application is where statistics show that avatars in a certain area are likely to abandon an interaction if a live agent is not provided within (say) 30 seconds. Such areas can be avoided by an automated contact center avatar until an agent is predicted to be free in 30 seconds time or less, so that the interaction with the automated avatar is tailored to minimize the difference between the expected wait time for an agent to become free and the estimated time delay for an agent to be required in the interaction with the automated avatar.

The spatial location of the inhabitant of the virtual world need not be (and usually will not be) the sole factor influencing the estimated time delay for a live agent to be required. The past history of that inhabitant with the contact center in question, or with other providers of goods and services may also influence the expected time delay, as may other elements of the profile associated with the inhabitant or the user controlling the inhabitant (so that serious potential purchasers who make quick decisions can be differentiated from those who tend to browse for a long time before making a purchase decision, for example). Even where such additional factors are taken into account it is anticipated that the location will normally provide a further and important factor used in making such predictions, so that a serious purchaser confronted with a choice of music downloads might be expected to require an agent more quickly than the same inhabitant when making a decision to purchase a computer from within a virtual environment.

Figure 5:
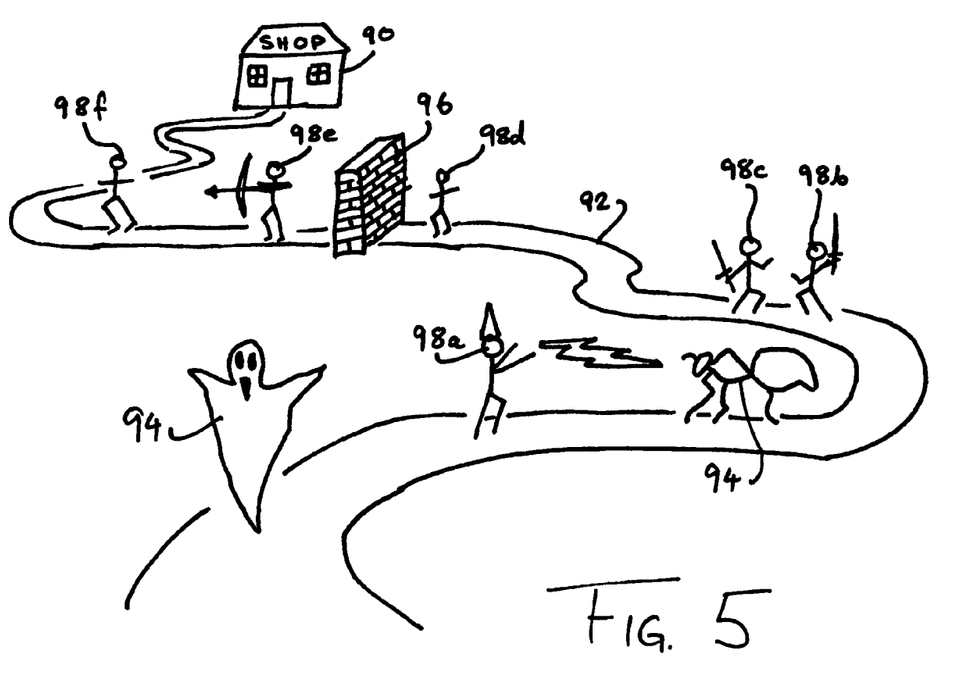
FIG. 5 is a schematic representation of a virtual queue representation within a game.

FIG. 5 is an on-screen representation of a competitive contact center queue, as presented by a game client used by a gamer. The scene is viewed from the first-person perspective of the gamer's character and shows a shop 90 which the customer wishes to access (the shop being the on-screen representation of a limited contact center resource), and a path 92 which meanders towards the shop 90 and which the gamer's character must complete. The contact center queuing component assesses the likely expected wait for the gamer to access the limited resource, and provides this information to the game server. The game server populates the path with obstacles and challenges which must be overcome or completed to progress along the path.

The obstacles and challenges are represented in FIG. 5 by creatures 94 which must be defeated or avoided to progress, and landscape features and hindrances such as a wall 96 to be climbed. Success or failure in overcoming these challenges, or a metric such as the time for completion of such challenges, can be used to promote or demote the player's contact within the contact center queue.

In addition to the obstacles and challenges 94,96 inserted by the game server, other players' avatars 98*a*-98*f* are also visible. Players may increase their position in the queue at the expense of other players by fighting the other avatars, such as can be seen with avatars 98*b* and 98*c*, or as can be seen with avatars 98*e* and 98*f*.

The game designers, in conjunction with the contact center designers, can tailor this queue to allow whatever degree of competition is desired. Thus, the landscape might be tailored to allow characters to hide from one another as they each sneak towards a goal, with players "sniping" any other visible characters and thereby either increasing their queue position incrementally or even swapping places in queue with the player sniped.

The ultimate goal may not be made visible to the players, so that the players simply keep moving their characters along a varying path or over a varying landscape until the contact associated with each such player reaches the top of its queue, at which point the player is shown the goal, or perhaps is removed from the competitive environment and brought to a rest area or teleported to a shop environment.

Figure 6:
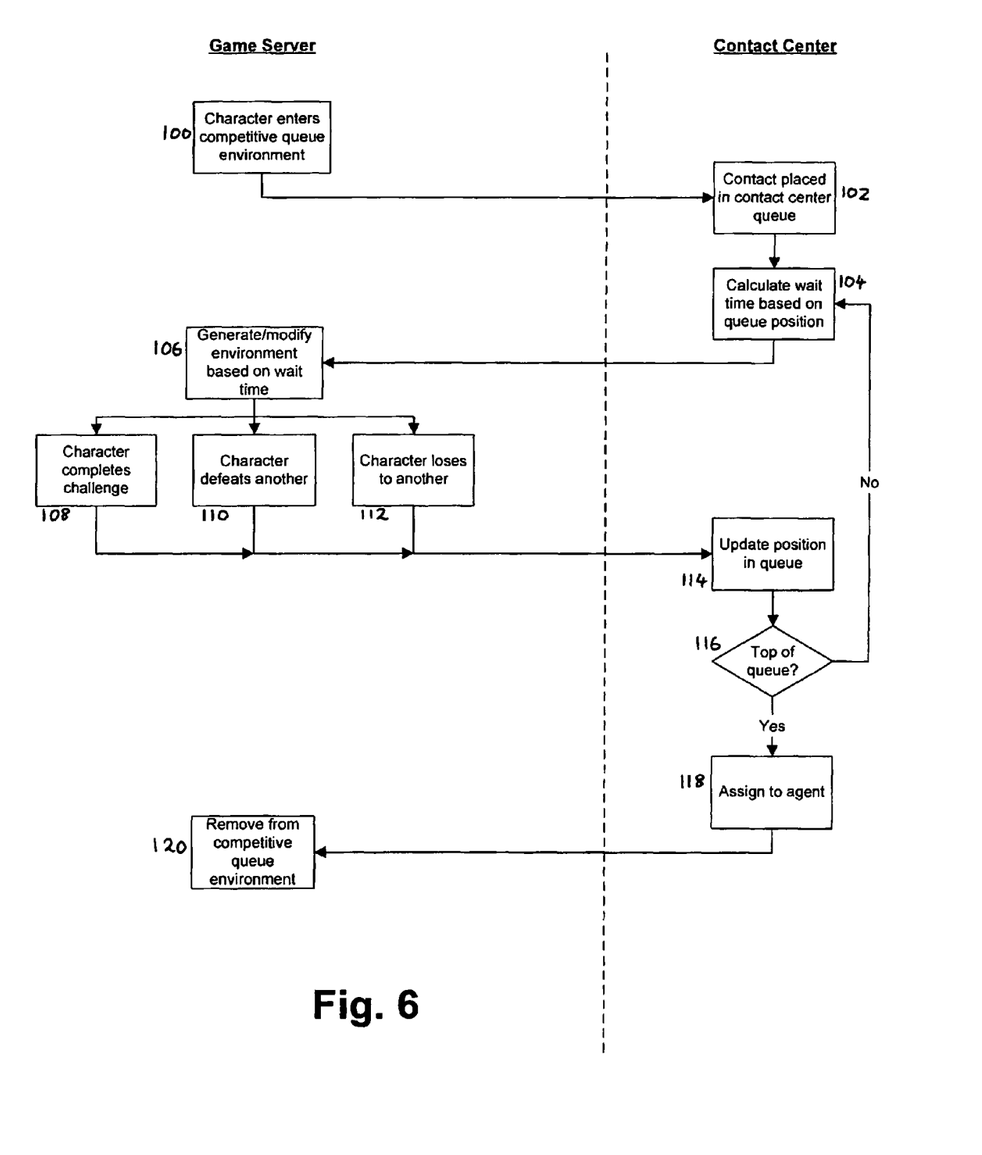
FIG. 6 is a flowchart of a method of implementing competitive queuing within a game.

Referring to FIG. 6, a flowchart showing the operation of such a competitive queue is provided, with the left side of the flowchart illustrating the steps which may be implemented on the game server, and the right side showing the steps which may be implemented on the contact center server.

In step 100, the character enters the competitive queuing environment, such as by entering a command or passing through a portal, thereby entering a landscape such as that of FIG. 5, for example (it will be understood that the actual appearance of a competitive queuing environment is likely to look radically different from the crude representation suggested in FIG. 5). Entering the competitive queuing environment causes a contact representing the character to be placed in an appropriate queue of the contact center, step 102. The contact center queue component calculates the expected wait time for that contact based on the queue position, step 104.

The environment as presented to the player of the character is generated or modified by the game server based on this expected wait time, step 106. Thus, the character might be confronted with the first in a series of puzzles, challenges, monsters, etc. which would be expected to occupy the character for at least part of the expected wait time. If the goal is visible, the distance to the goal and the challenges between the character and the goal might be tailored so the expected time to reach the goal is about equal to the wait time calculated by the contact center.

When the character completes a challenge, step 108, this is notified by the game server to the contact center queuing component and in step 114, the contact position in the queue is updated based on the progress achieved. (Alternatively, the completion of a challenge may not influence the queue position but simply allows the character to progress towards the goal.)

As shown in FIG. 5, characters may fight with one another within the competitive queuing environment. If the character whose progress is being followed in FIG. 6 defeats another character, step 110, this is used to update the victorious character's position in the queue. Most simply, the priority level of the character can be increased with each such victory, so that the queue position is updated in step 114 based on the new priority. Alternatively, and perhaps preferably, the character's queue position can be switched with that of the character who lost the fight, and in this way a character can leapfrog along the queue by beating a succession of other characters ahead of it in the environment.

Conversely, if the character under consideration loses to another, step 112, the position of the character in the queue is updated in step 114 adversely, perhaps due to a lower priority rating being assigned, or perhaps due to a swap in position with the character who was victorious.

Following the updated position determination in step 114, a check is made to see if the contact is at the top of the queue, step 116. If not, the process reverts to steps 104 and 106, i.e. the wait time to reach the top of the queue is updated based on the new queue position, and the game server is notified allowing it to modify the player's virtual environment to reflect this new wait time.

If, in step 116, the contact reaches the top of the queue, then it is assigned to an agent, step 118. The character is removed from the competitive queuing environment according to the design of the game, step 120; and typically, the game server will co-operate with the contact center and the player's computer system to place the player of the character in immediate contact with the resource for which the character has successfully queued.

It will be appreciated that many variations on this process can be imagined. For example, characters may be moved along the queue at a minimum speed to avoid disillusionment by poor players, or a ceiling may be imposed on how much a contact's position can be adversely or positively affected by the interaction with the environment and the other players. Nevertheless the introduction of competitive queuing techniques provides a new and attractive queuing model for contact center operators, as well as alleviating the unattractiveness of queuing for users of the contact center by adding a game element.

Figure 7:
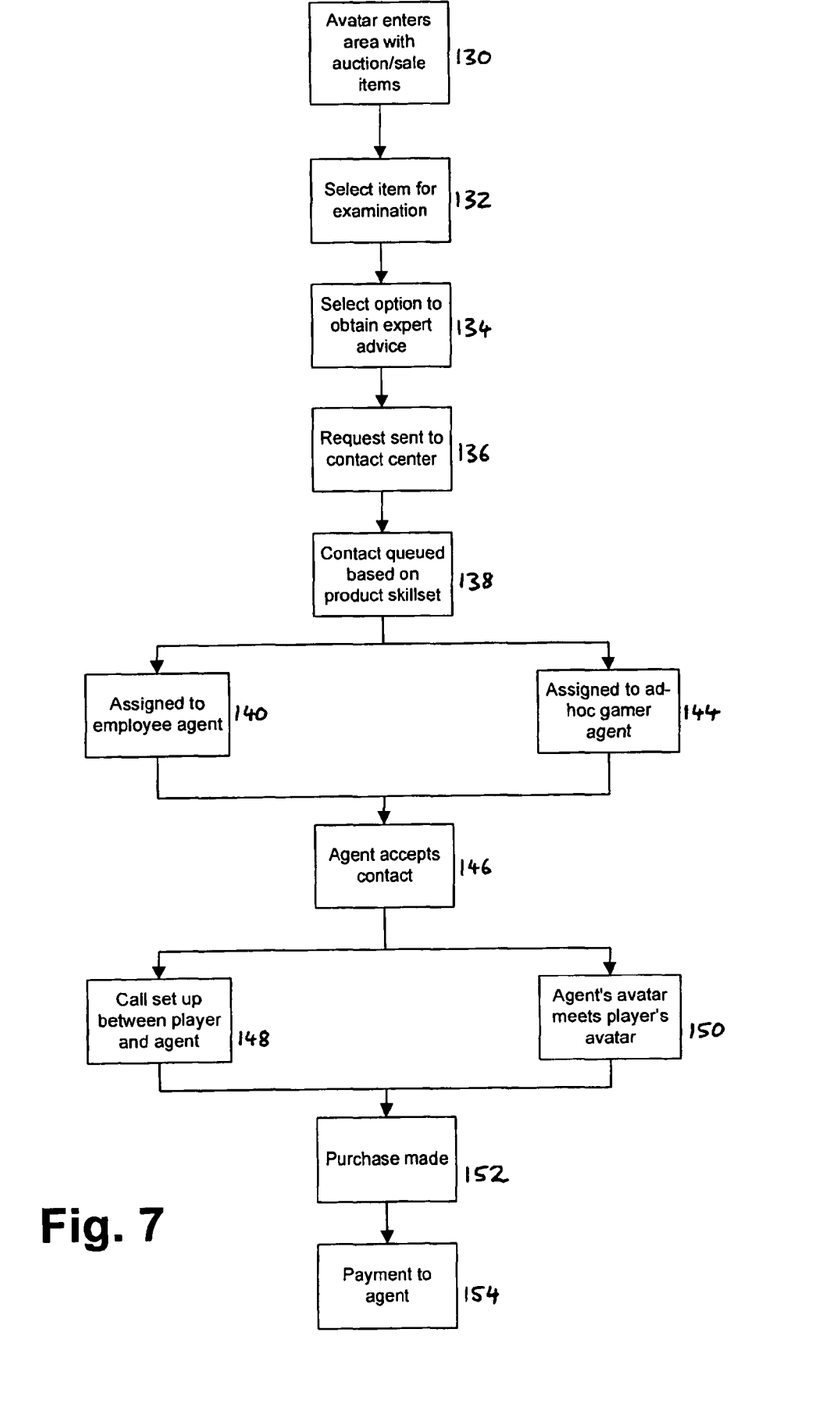
FIG. 7 is a flowchart of a method of integrating a virtual environment, a sales website, and a contact center.

The virtual environment can be integrated with other businesses as well as with a contact center. FIG. 7 demonstrates the integration of a virtual world with an auction site and a contact center. Frequently, players of games and users of virtual environments will wish to purchase items which may be advertised outside of the game, such as items of (virtual) equipment to be used by their avatars, or very often, the avatars themselves, so that a new player can purchase a character which has already had its skills developed and may already have an inventory of useful items. Auction sites such as eBay.com may sell such items and avatars. (The following discussion is applicable both to sites which operate auctions and those which operate straight sales, or sites such as eBay which offer both auctions and sales.)

It is envisaged, for the implementation of FIG. 7, that a virtual environment contains an auction or sales area which characters can visit, and which will provide access to those items being sold on eBay or some other auction or selling site which are for use in that virtual environment. It could be agreed with the auction site that all items having a relevance in this virtual environment would appear in this auction area, or it might be a premium service offered by the auction site (e.g. sellers could pay extra to have their item advertised in-game). Similarly entrance to the area could be free or could incur a charge.

The manner in which items are presented to the player's character is immaterial. In some cases it might be considered important to present the items in the context of the virtual environment, so that a medieval game world might use a programming interface to take listings from eBay relating to (say) weapons for use in that game, and translate each such listing into a virtual representation of the weapon displayed on a rack of similar weapons so the player might be able to inspect and handle each one. The item normally contained in the text listing could be shown as printed on a tag tied to the weapon, for example. Alternatively, if no problem was envisaged with showing the auction site listings themselves in-game, the items could be displayed as they are actually listed on the auction site, such as by showing each listing as a page of a catalog, or providing a virtual terminal within the game for the user to access the auction site itself.

A difficulty with such in-game sales is that players, particularly inexperienced players, might not be able to judge the value of an item from its listing. So, for example, they may see a dozen different swords, each with different attributes, magical abilities, and so on, but not be able to distinguish the best sword for their character to purchase, or be able to spot a clearly overpriced sword.

As shown in step 130, therefore, the avatar of a player interested in making a purchase enters the auction area, as the designers of the virtual world have chosen to represent it. The avatar selects an item for examination, step 132, and is presented with an option to obtain expert advice. On selecting this option, step 134, a request is sent to the contact center to initiate a contact between the player of the avatar and an agent of the contact center having an expertise in the type of item or avatar being inspected for purchase, step 136.

The contact center queues a contact, based on this request, to an appropriate queue, step 138. On reaching the top of a queue (or indeed if an agent is available immediately) the contact is assigned to an agent.

Two options for assigning the contact are shown. It may be assigned to an employee agent, i.e. an agent employed by the contact center operator, step 140. Alternatively, the contact center may have assigned to certain other players of the game a temporary accreditation as an agent with a particular skillset, as will be described further below. Such agents are referred to as ad-hoc gamer agents, and the contact may be assigned to such an agent, step 144.

In either event, the agent accepts the contact, step 146, at which point the player and agent are placed into contact. Two options are shown, either of which may be made available to the employee agents as well as to the ad-hoc gamer agents. A call can be set up between the player and the agent, step 148. Alternatively or additionally, the agent's avatar can be placed into contact within the game with the avatar considering the purchase, step 150. This can be done by bringing the agent's avatar to the auction area (or bringing the player's avatar to the agent avatar's location), or it can be done using other in-game communication methods. The agent can thus provide the prospective purchaser with the benefit of the agent's own experience, thereby increasing the possibility of a successful sale.

Figure 8:
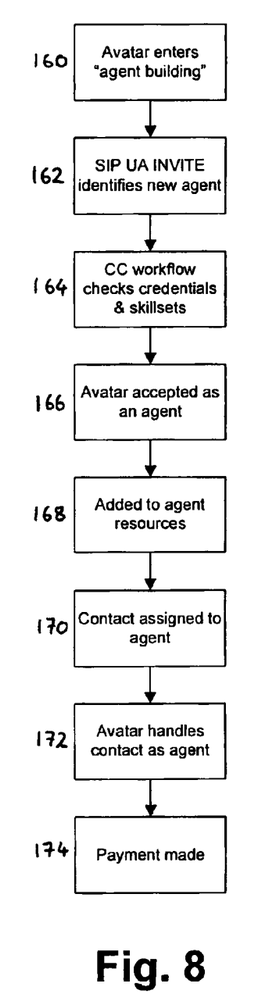
FIG. 8 is a flowchart of a method of employing ad hoc agents from a virtual environment

A purchase is made, step 152, following which a payment mechanism ensures that a payment is allocated to the agent (or the agent's employer), step 154. The rules of the auction center may specify that the agent's fee is payable in all cases, i.e. Even if no purchase is made. The payment can be negotiated, or it can be a fixed price, or it can be a percentage of the purchase price, among other possibilities FIG. 8 shows how an ad-hoc gamer agent might become involved in a contact center integrated with a game (or other virtual environment), including but not limited to a contact center employed as in FIG. 7 to provide advice on purchases.

A user of the game wishing to act as an ad-hoc agent, controls his or her avatar to enter an "agent building", step 160, to give just one example of how such an interest might be expressed within the context of a virtual environment. (This could be rendered as the staff entrance beside the main buyer's entrance into an auction or sales area.)

This action of the avatar serves to initiate a SIP UA INVITE message from the game server to the contact center BBUA, with the INVITE message identifying the contact as request as relating to a prospective new agent, step 162. The BBUA passes the request on to the CC workflow for processing, and the CC workflow checks the credentials and skillsets of the prospective new agent, step 164. This checking can be as cursory or as detailed as may be deemed necessary. For example, for an avatar previously authorized, it may simply be a case of looking up a list of known agents and confirming that the avatar appears on that list. For a prospective new agent who may be asked to advise on valuable transactions, however, there may be examinations on the avatar's knowledge, communications skills, and so on, from which the skillsets of the agent may be determined (e.g. Fluent Spanish and English speaker, expert knowledge of swords, beginner knowledge of clothing styles), and these skillsets can be used in deciding which contacts can be handled by that agent.

If the avatar is accepted as an agent, step 166, it is added to the agent resources of the contact center, step 168, where it remains as long as the avatar remains logged in, or as long as the avatar remains in the auction area perhaps. From that point onwards, the contact center can consider this avatar as another agent resource available to it. Thus, a contact can be assigned to the agent, step 170, causing the agent avatar to be placed in contact with the purchaser avatar associated with that contact, step 172. Following completion of their interaction, a payment can be made as described earlier, step 174.

Another way in which ad hoc agents may be utilized is in providing services outside the context of auction or item sales. For example, a service may be advertised within a virtual environment to provide tours of the environment by experienced and knowledgeable guides. Any inhabitant could apply for a tour guide position, and qualification could be by means of an interactive or written test, by interview, or by observing a demonstration tour by the applicant. Success can be qualified, e.g. an inhabitant can be allocated skillsets for the locations where knowledge has successfully been shown.

Upon acceptance, the successful inhabitant is added to a list of active agents. The inhabitant can be considered active at all times when logged in, or only when he or she chooses to become active and available for work.

When new players decide to take a tour, they can approach a tour office and ask for an agent (or perhaps do so without going to an office). The tour request is passed as a request for contact to the contact center and allocated among the available agents. The successful agent is placed in contact with the inhabitant representing the customer, and payment can take place according to the business model of the tour company.

The invention is not limited to the embodiments described herein but can be amended or modified without departing from the scope of the present invention.

We claim:

1. A method of operating a contact center having an interface with a virtual environment implemented in a computerized system, comprising the steps of:
   a) receiving from the virtual environment spatial information relating to the spatial position within the virtual environment of an inhabitant of the virtual environment;
   b) creating and maintaining contact information in said contact center, said contact information being associated with said inhabitant and including said spatial information;
   c) providing said contact information to a queuing system of the contact center; and
   d) said queuing system making a queuing decision based on said spatial information.

2. A method of operating a contact center as claimed in claim 1, wherein said contact is created automatically in step (b) as a result of receiving in step (a) said location information.

3. A method of operating a contact center as claimed in claim 1, wherein said contact is created when a match is noted between said spatial position of said inhabitant and a predetermined condition.

4. A method of operating a contact center as claimed in claim 1, wherein said contact is created in step (b) as a result of a user of said virtual environment having control of said inhabitant initiating contact with said contact center.

5. A method of operating a contact center as claimed in claim 1, wherein said queuing decision of step (d) is based not only on said spatial information but also on other information available to said queuing system.

6. A method of operating a contact center as claimed in claim 1, wherein said spatial information is selected from:
    (i) an absolute position within said virtual environment;
    (ii) an indication of a zone or area of said virtual environment;
    (iii) an identification of another character, artefact, object or entity of said virtual environment in the vicinity of said inhabitant;
    (iv) an identification of another character, artefact, object or entity of said virtual environment in the field of view of said inhabitant;
    (v) an identification of another character, artefact, object or entity of said virtual environment in the vicinity of a projected path of travel of said inhabitant; and
    (vi) an identification of a member of a class of entities present in said virtual environment, said member of said class being selected on the basis of proximity to or accessibility from the location of said individual.

7. A method of operating a contact center as claimed in claim 1, further comprising the steps of allocating said contact to an agent of said contact center, and providing said location information to a system employed by said agent of said contact center prior to or during an interaction with said inhabitant.

8. A method of operating a contact center as claimed in claim 7, wherein said system employed by said agent comprises a program providing access to said virtual environment.

9. A computer program product comprising a data carrier having encoded thereon machine readable instructions which when executed in a computer system of a contact center having an interface with a virtual environment, are effective to cause said computer system to:
    a) receive from the virtual environment spatial information relating to the spatial position within the virtual environment of an inhabitant of the virtual environment;
    b) create and maintaining contact information in said contact center, said contact information being associated with said inhabitant and including said spatial information;
    c) provide said contact information to a queuing system of the contact center; and
    d) said queuing system making a queuing decision based on said spatial information.

10. A contact center computer system having an interface with a virtual environment, said computer system operating a computer program thereon which causes said contact center to:
    a) receive from the virtual environment spatial information relating to the spatial position within the virtual environment of an inhabitant of the virtual environment;
    b) create and maintaining contact information in said contact center, said contact information being associated with said inhabitant and including said spatial information;
    c) provide said contact information to a queuing system of the contact center; and
    d) said queuing system making a queuing decision based on said spatial information.

11. A method of operating a contact center having an interface with a virtual environment implemented in a computerized system, comprising the steps of:
    a) receiving from the virtual environment spatial information relating to the spatial position within the virtual environment of an inhabitant of the virtual environment;
    b) creating and maintaining contact information in said contact center, said contact information being associated with said inhabitant;
    c) providing said contact information to a queuing system of the contact center, such that said inhabitant is queued to interact with a live agent of the contact center;
    d) estimating an expected wait time for a live agent to become available to interact with said inhabitant;
    e) using said spatial information to estimate a time delay for said inhabitant to require live agent intervention following an automated interaction;
    f) comparing said estimated time delay with said expected wait time; and
    g) providing to said inhabitant an automated interaction designed to reduce the difference between said estimated time delay and said expected wait time.

12. A method of operating a contact center as claimed in claim 11, wherein in step (e) said spatial information is used in conjunction with other information to estimate said time delay.

13. A method of operating a contact center as claimed in claim 11, wherein the spatial information employed in estimating the time delay is selected from:
    (i) an absolute position within said virtual environment;
    (ii) an indication of a zone or area of said virtual environment;
    (iii) an identification of another character, artefact, object or entity of said virtual environment in the vicinity of said inhabitant;
    (iv) an identification of another character, artefact, object or entity of said virtual environment in the field of view of said inhabitant;
    (v) an identification of another character, artefact, object or entity of said virtual environment in the vicinity of a projected path of travel of said inhabitant; and
    (vi) an identification of a member of a class of entities present in said virtual environment, said member of said class being selected on the basis of proximity to or accessibility from the location of said individual.

14. A method of operating a contact center as claimed in claim 11, wherein the step of providing to said inhabitant an automated interaction designed to reduce the difference between said estimated time delay and said expected wait time, comprises selecting from among a plurality of script options; accelerating or retarding a rate of interaction; or delaying the initiation of an interaction.

15. A computer program product comprising a data carrier having encoded thereon machine readable instructions which when executed in a computer system of a contact center having an interface with a virtual environment, are effective to cause said computer system to:
    a) receive from the virtual environment spatial information relating to the spatial position within the virtual environment of an inhabitant of the virtual environment;
    b) create and maintaining contact information in said contact center, said contact information being associated with said inhabitant;
    c) provide said contact information to a queuing system of the contact center, such that said inhabitant is queued to interact with a live agent of the contact center;

d) estimate an expected wait time for a live agent to become available to interact with said inhabitant;

e) use said spatial information to estimate a time delay for said inhabitant to require live agent intervention following an automated interaction;

f) compare said estimated time delay with said expected wait time; and g) provide to said inhabitant an automated interaction designed to reduce the difference between said estimated time delay and said expected wait time.

16. A contact center computer system having an interface with a virtual environment, said computer system operating a computer program thereon which causes said contact center to:

a) receive from the virtual environment spatial information relating to the spatial position within the virtual environment of an inhabitant of the virtual environment;

b) create and maintaining contact information in said contact center, said contact information being associated with said inhabitant;

c) provide said contact information to a queuing system of the contact center, such that said inhabitant is queued to interact with a live agent of the contact center;

d) estimate an expected wait time for a live agent to become available to interact with said inhabitant;

e) use said spatial information to estimate a time delay for said inhabitant to require live agent intervention following an automated interaction;

f) compare said estimated time delay with said expected wait time; and g) provide to said inhabitant an automated interaction designed to reduce the difference between said estimated time delay and said expected wait time.

17. A method of operating a computerized system implementing a virtual environment and having an interface with a contact center, comprising the steps of:

a) receiving from the contact center information regarding a queuing system maintained by said contact center;

b) providing within the virtual environment a virtual queue representation of said queuing system, based on said received information;

c) providing an inhabitant of said virtual environment with access to said virtual queue representation when a contact is queued for said inhabitant in said queuing system of the contact center;

d) providing within said virtual queue representation one or more entities with which said inhabitant may interact with a variable result;

e) upon said inhabitant interacting with one of said entities, determining a result of said interaction; and f) notifying the result of said interaction to said queuing system of the contact center whereby the queuing position of said inhabitant in the queuing system of the contact center may be modified based on said result.

18. A method of operating a system as claimed in claim 17, wherein said virtual queue representation comprises a journey which may be undertaken by said inhabitant within said environment.

19. A method of operating a system as claimed in claim 17, wherein said one or more entities with which said inhabitant may interact with a variable result are selected from one or more of:

(i) an inhabitant of said virtual environment operated by a user of said environment;

(ii) an automated inhabitant of said virtual environment;

(iii) an obstacle to be negotiated;

(iv) a maze to be traversed;

(v) a journey to be completed;

(vi) a puzzle to be solved;

(vii) a challenge to be undertaken; and (viii) a game to be played.

20. A method of operating a system as claimed in claim 17, wherein said one or more entities with which said inhabitant may interact are presented sequentially to said inhabitant.

21. A method of operating a system as claimed in claim 20, wherein said sequential presentation occurs as said inhabitant moves along a path within said environment.

22. A method of operating a system as claimed in claim 17, wherein said one or more entities with which said inhabitant may interact with a variable result comprise at least one other inhabitant also present in said virtual queue representation, said at least one other inhabitant also having a queuing position within said queuing system of the contact center, wherein said result of said interaction is determinative of a modification of the queuing positions of each of the inhabitants involved in said interaction.

23. A method of operating a system as claimed in claim 17, further comprising the steps, carried out at the contact center, of:

a) providing said information regarding said queuing system to said computerized system;

b) receiving notification of the result of said interaction; and c) modifying the queuing position of said inhabitant in the queuing system of the contact center based on said result.

24. A method of operating a system as claimed in claim 23, wherein the queuing position of said inhabitant is modified to ensure a minimum rate of progress within the queue, irrespective of the result of said interaction.

25. A computer program product comprising a data carrier having encoded thereon machine readable instructions which when executed in a computerized system implementing a virtual environment and having an interface with a contact center, are effective to cause said computerized system to:

a) receive from the contact center information regarding a queuing system maintained by said contact center;

b) provide within the virtual environment a virtual queue representation of said queuing system, based on said received information;

c) provide an inhabitant of said virtual environment with access to said virtual queue representation when a contact is queued for said inhabitant in said queuing system of the contact center;

d) provide within said virtual queue representation one or more entities with which said inhabitant may interact with a variable result;

e) upon said inhabitant interacting with one of said entities, determine a result of said interaction; and f) notify the result of said interaction to said queuing system of the contact center whereby the queuing position of said inhabitant in the queuing system of the contact center may be modified based on said result.

26. A computerized system implementing a virtual environment and having an interface with a contact center, said system executing a program which is effective to cause said computerized system to:

a) receive from the contact center information regarding a queuing system maintained by said contact center;

b) provide within the virtual environment a virtual queue representation of said queuing system, based on said received information;

c) provide an inhabitant of said virtual environment with access to said virtual queue representation when a contact is queued for said inhabitant in said queuing system of the contact center;
d) provide within said virtual queue representation one or more entities with which said inhabitant may interact with a variable result;
e) upon said inhabitant interacting with one of said entities, determine a result of said interaction; and
f) notify the result of said interaction to said queuing system of the contact center whereby the queuing position of said inhabitant in the queuing system of the contact center may be modified based on said result.

27. A method of operating a system comprising a virtual environment implemented in a computerized system and a contact center having an interface with said virtual environment, comprising the steps of:
a) providing within the virtual environment an interface with an external website having an offer for sale;
b) providing to an inhabitant of the virtual environment a mechanism to request live agent assistance with a purchasing decision;
c) upon said inhabitant requesting live agent assistance, providing said request from said virtual environment to said contact center;
d) upon said contact center allocating said request to an agent of said contact center, placing said agent and said inhabitant in communication with one another.

28. A computer program product comprising a data carrier having encoded thereon machine readable instructions which when executed in a computerized system implementing a virtual environment and having an interface with a contact center, are effective to cause said computerized system to:
a) provide within the virtual environment an interface with an external website having an offer for sale;
b) provide to an inhabitant of the virtual environment a mechanism to request live agent assistance with a purchasing decision;
c) upon said inhabitant requesting live agent assistance, provide said request from said virtual environment to said contact center; and
d) upon said contact center allocating said request to an agent of said contact center, place said agent and said inhabitant in communication with one another.

29. A computerized system implementing a virtual environment and having an interface with a contact center, said computerized system operating a program effective to cause the computerized system to:
a) provide within the virtual environment an interface with an external website having an offer for sale;
b) provide to an inhabitant of the virtual environment a mechanism to request live agent assistance with a purchasing decision;
c) upon said inhabitant requesting live agent assistance, provide said request from said virtual environment to said contact center; and
d) upon said contact center allocating said request to an agent of said contact center, place said agent and said inhabitant in communication with one another.

30. A method of operating a contact center having an interface with a virtual environment implemented in a computerized system, comprising the steps of:
a) receiving from the virtual environment a request issued by or on behalf of an inhabitant of said virtual environment;
b) identifying said request as being a request to act as an agent of the contact center;
c) authorizing said inhabitant to act as an agent of the contact center;
d) adding, to a stored record of agents available to the contact center, information relating to said inhabitant;
e) receiving from said virtual environment contact requests from inhabitants of said virtual environment for contact with an agent; and
f) allocating said contact requests among said agents identified in said stored record.

31. A method of operating a contact center as claimed in claim 30, wherein said request in step (a) is received as a result of said first inhabitant accessing a location in the virtual environment which is assigned as a registration location for inhabitants wishing to act as agents.

32. A method of operating a contact center as claimed in claim 30, wherein step (c) comprises determining that said first inhabitant is recorded as being authorized to act as an agent.

33. A method of operating a contact center as claimed in claim 30, wherein step (c) comprises determining that said first inhabitant passes a test presented to said first inhabitant.

34. A method of operating a contact center as claimed in claim 30, wherein step (d) comprises recording a skillset for said first inhabitant in said stored record, whereby said skillset information is used in allocating contact requests in step (f).

35. A computer program product comprising a data carrier having encoded thereon machine readable instructions which when executed in a computerized system of a contact center having an interface with a virtual environment, are effective to cause said computerized system to:
a) receive from the virtual environment a request issued by or on behalf of a first inhabitant of said virtual environment;
b) identify said request as being a request to act as an agent of the contact center;
c) authorize said first inhabitant to act as an agent of the contact center;
d) add, to a stored record of agents available to the contact center, information relating to said first inhabitant; and
e) receive from said virtual environment contact requests from further inhabitants of said virtual environment for contact with an agent; and
f) allocate said contact requests among said agents identified in said stored record.

36. A computerized system of a contact center having an interface with a virtual environment, said computerized system operating a program effective to cause the computerized system to:
a) receive from the virtual environment a request issued by or on behalf of a first inhabitant of said virtual environment;
b) identify said request as being a request to act as an agent of the contact center;
c) authorize said first inhabitant to act as an agent of the contact center;
d) add, to a stored record of agents available to the contact center, information relating to said first inhabitant; and
e) receive from said virtual environment contact requests from further inhabitants of said virtual environment for contact with an agent; and
f) allocate said contact requests among said agents identified in said stored record.

\* \* \* \* \*